(12) United States Patent
Wegner

(10) Patent No.: US 11,767,245 B1
(45) Date of Patent: Sep. 26, 2023

(54) PROCESS FOR BORON REMOVAL FROM WATER

(71) Applicant: Paul Charles Wegner, San Carlos, CA (US)

(72) Inventor: Paul Charles Wegner, San Carlos, CA (US)

(*) Notice: Subject to any disclaimer, the term of this patent is extended or adjusted under 35 U.S.C. 154(b) by 293 days.

(21) Appl. No.: 17/083,885

(22) Filed: Oct. 29, 2020

Related U.S. Application Data

(60) Provisional application No. 62/973,915, filed on Oct. 31, 2019.

(51) Int. Cl.
| | |
|---|---|
| C02F 9/00 | (2023.01) |
| B01J 41/07 | (2017.01) |
| B01J 41/14 | (2006.01) |
| B01J 49/57 | (2017.01) |
| B01D 61/02 | (2006.01) |
| C02F 1/42 | (2023.01) |
| C02F 1/68 | (2023.01) |
| C02F 1/44 | (2023.01) |
| C02F 1/66 | (2023.01) |
| C02F 101/10 | (2006.01) |
| C02F 103/06 | (2006.01) |

(52) U.S. Cl.
CPC ............. C02F 9/00 (2013.01); B01D 61/025 (2013.01); B01J 41/07 (2017.01); B01J 41/14 (2013.01); B01J 49/57 (2017.01); *B01D 2311/25* (2013.01); *B01D 2311/2623* (2013.01); *C02F 1/42* (2013.01); *C02F 1/441* (2013.01); *C02F 1/66* (2013.01); *C02F 1/683* (2013.01); *C02F 2001/425* (2013.01); *C02F 2101/108* (2013.01); *C02F 2103/06* (2013.01); *C02F 2209/06* (2013.01); *C02F 2303/16* (2013.01)

(58) Field of Classification Search
CPC ... C02F 9/00; B01D 61/025; B01J 41/07; B01J 41/14; B01J 49/57
See application file for complete search history.

(56) References Cited

U.S. PATENT DOCUMENTS

| | | |
|---|---|---|
| 5,055,201 A | 10/1991 | Wegner |
| 5,078,900 A | 1/1992 | Wegner |
| 5,095,926 A | 3/1992 | Wegner |
| 5,998,640 A | 12/1999 | Haefele et al. |
| 6,247,480 B1 | 6/2001 | Wegner |
| 7,108,792 B2 | 9/2006 | Wegner |
| 7,399,366 B1 | 7/2008 | Wegner et al. |

(Continued)

OTHER PUBLICATIONS

Darwish et al., Boron removal from water with fractionized Amberlite IRA743 resin, Desalination, Vol 17 Aug. 15, 2015, p1-6 (Year : 2015).*

(Continued)

*Primary Examiner* — Chester T Barry
(74) *Attorney, Agent, or Firm* — Head, Johnson, Kachigian & Wilkinson, PC

(57) ABSTRACT

A process for boron removal from feed water. The process includes the steps of introducing a stream of feed water with sodium borate salt or calcium borate salt therein to an ion exchange vessel containing boron-selective resin modified with potassium sulfate or sodium sulfate. The feed water is reacted with the boron-selective resin modified with sodium sulfate or potassium sulfate. The ion exchange resin in the ion exchange vessel is periodically regenerated.

13 Claims, 1 Drawing Sheet

(56) References Cited

U.S. PATENT DOCUMENTS

| | | |
|---|---|---|
| 7,413,084 B2 | 8/2008 | Wegner |
| 7,562,664 B2 | 7/2009 | Wegner et al. |
| 8,226,820 B1 | 7/2012 | Wegner |
| 9,670,075 B1 | 6/2017 | Wegner |
| 10,252,921 B1* | 4/2019 | Wegner .............. B01J 49/60 |
| 2002/0056690 A1 | 5/2002 | Wegner |
| 2002/0102229 A1 | 8/2002 | Wegner |
| 2003/0151024 A1 | 8/2003 | Wegner |
| 2004/0142834 A1 | 7/2004 | Wegner |
| 2005/0065052 A1 | 3/2005 | Wegner |
| 2005/0142096 A1 | 6/2005 | Wegner |
| 2005/0189301 A1 | 9/2005 | Wegner et al. |
| 2005/0194319 A1 | 9/2005 | Wegner |
| 2005/0263740 A1 | 12/2005 | Wegner |
| 2006/0081503 A1 | 4/2006 | Wegner |
| 2008/0060978 A1 | 3/2008 | Wegner |
| 2008/0272037 A1 | 11/2008 | Wegner et al. |
| 2008/0296232 A1 | 12/2008 | Wegner |
| 2009/0057231 A1 | 3/2009 | Schelhaas et al. |
| 2015/0053620 A1 | 2/2015 | Suri et al. |
| 2017/0081215 A1* | 3/2017 | Broschek Santelices et al. .......... B01D 15/361 |
| 2020/0231473 A1* | 7/2020 | Choong et al. ....... C02F 1/5245 |
| 2022/0281758 A1* | 9/2022 | Wallace ................ C01B 35/10 |

OTHER PUBLICATIONS

Kabay et al., Removal and recovery of boron from geothermal wastewater by selective ion exchange resins, I. Laboratory tests, Reactive & Functional Polymers, 60 (2004), 163-170 (Year: 2004).*

Kunin at al., "Characterization of a Boron-Specific Ion Exchange Resin," I&EC Product Research and Development, Vol 3 No. 4 ( 1964) p.304-306 (Year: 1964).*

Simonnot et al., "BORON REMOVAL FROM DRINKING WATER WITH A BORON SELECTIVE RESIN: IS THE TREATMENT REALLY SELECTIVE?", Wat. Res., Vol 34, No. 1, p109-116 (2000) (Year: 2000).*

Nadav "Boron removal from seawater reverse osmosis permeate utilizing selective ion exchange resin", Desalination (1999), 124(1-3), 131-135. (Year: 1999).

Wilcox et al. "Boron removal from high-purity water by selective ion exchange", Ultrapure Water (2000), 17(6), 40, 42-43, 45-46, 48-51, (Year: 2000).

* cited by examiner

PROCESS FOR BORON REMOVAL FROM WATER

CROSS REFERENCE

This application is based on and claims priority to U.S. Provisional Pat. Application Serial No. 62/973,915, filed Oct. 31, 2019, which is incorporated herein in its entirety by reference.

BACKGROUND OF THE INVENTION

Field of the Invention

The present invention is directed to an enhanced method or process to remove boron from water utilizing an unpressurized, ambient temperature open ion exchange resin vessel. In particular, the present invention is directed to an enhanced method or process to remove boron using a boron selective resin in sulfate form. In addition, the present invention provides a process or method for regeneration of the resin utilized in the boron removal process and provides an ambient pressure ambient temperature process and apparatus for concentration of the regeneration output.

Description of the Related Art

Agriculture, such as orchards and vineyards, requires vast amounts of water for irrigation. Irrigation demand peaks at various times, such as in mid-summer.

Boron occurs naturally in borax deposits produced by the evaporation of water bodies. While trace amounts of boron are known to promote plant growth, excessive boron levels in water are known to be toxic to plants. Some normal irrigation water sources, such as well water, contain high levels of boron. In addition, excessive boron in potable water is undesirable. Indeed, some jurisdictions or areas are considering boron limits in drinking water.

Desalinated water from oil and gas well production and from seawater desalination reverse osmosis is especially high in boron content. It is desirable to desalinate oil well production water in order to minimize deep well injection of this water. Therefore, it is also desirable to remove boron from the water both quickly and economically.

Existing processes and procedures for boron removal from water are considered prohibitively expensive for many applications. Known boron removal resin is expensive, so maximizing boron loading capacity and flow through ion exchange resin beds is important.

Various known prior art approaches to boron removal from water are as follows:

A. Reverse Osmosis

In the case of reverse osmosis, the high volume of reject (retentate) water is expensive to transport and dispose of in deep injection wells or other means. Reverse osmosis is nonselective, so all the salt is removed. This limits the yield of product water. The pH must be increased before reverse osmosis to remove sufficient amounts of boron from the water, which increases the salt level of reject water even more. The product (permeate) water is too alkaline for many uses. Therefore, acid must be added to restore a proper pH for irrigation and other uses.

B. Ion Exchange

Known boron selective ion exchange resin is expensive and has relatively low loading capacity. Loading capacity can be compromised by the presence of various chemicals in the source water. In addition, the standard regeneration process is a two-step process which requires regeneration with acid followed by regeneration with caustic. The two-step process doubles the regeneration time. Since many water sources contain carbonates, the standard downward flow acid regeneration compromises boron removal, due to $CO_2$ gas release into the resin bed during regeneration. This limits acid access to the resin. The resulting regeneration waste is a dilute mixture of sodium chloride, boric acid and sodium borate. This mixture has little commercial value and is considered a hazardous liquid waste, which is expensive to transport and dispose of. The volume of regeneration waste is too expensive to concentrate by conventional means, such as membranes or common energy intensive evaporators.

In one prior art example, boron-selective resin is used in free base form to remove boron from various water sources. See for example, Applicant's U.S. Pat. Nos. 10,252,921 and 10,604,424 which are incorporated herein by reference. The exhausted resin bed is regenerated with hydrochloric acid to remove the boron from the resin bed as a mixture of excess hydrochloric and boric acid. The acid is rinsed off and a sodium hydroxide solution is passed through the resin to convert it to the free base form. The excess sodium hydroxide is rinsed off and combines with the excess acid from the first step.

C. Pressurized Resin Vessels

Since the boron resin is expensive, it is desirable to have large diameter vessels with minimal resin depth to maximize resin loading capacity, while minimizing pressure drop across the resin bed during service mode. However, large diameter pressure vessels are expensive, while multiple small vessels are complex to operate and require a significant number of valves.

D. Evaporation

The evaporation of water with high salt content is an energy intensive process. The use of solar ponds is an energy free method; however, the average evaporation rate is quite slow at 0.006 to 0.009 inches per hour. For example, a 10 ft. diameter pond would have an evaporation rate of 0.3 to 0.5 gallons per hour.

Multiple effect evaporators are more energy efficient to operate but require expensive equipment. Similarly, vapor recompression requires expensive equipment and requires significant mechanical energy. Neither of these methods performs well when evaporating liquids to solids.

There still remains a need for a cost-efficient high-volume process to remove boron from water.

Accordingly, it is a principal object and purpose of the present invention to provide an enhanced process and apparatus for boron removal from water.

It is a further object and purpose of the present invention to regenerate boron removal resin.

It is a further object and purpose of the present invention to provide a process and apparatus to concentrate boron in a liquid stream.

SUMMARY OF THE INVENTION

The process of the present invention uses a boron selective ion exchange resin in sulfate form to remove boron from a water feed source. In particular, a stream of feed water with sodium borate salt or potassium borate salt therein is introduced into an unpressurized, ambient temperature open ion exchange vessel containing sulfate or sodium sulfate.

The ion exchange resin in sulfate form is periodically regenerated with sulfuric acid. Regeneration effluent pH is adjusted with a pH resin bed before nanofiltration to filter out potassium sulfate which is returned to the irrigation water. The permeate is adjusted with a pH resin bed vessel before a reverse osmosis membrane to produce a concentrated potassium borate fertilizer while the permeate is pH adjusted with acid and returned to the ion exchange resin bed in closed loop fashion in order to continue the process to remove additional boron.

DETAILED DESCRIPTION OF THE INVENTION

Figure 1:
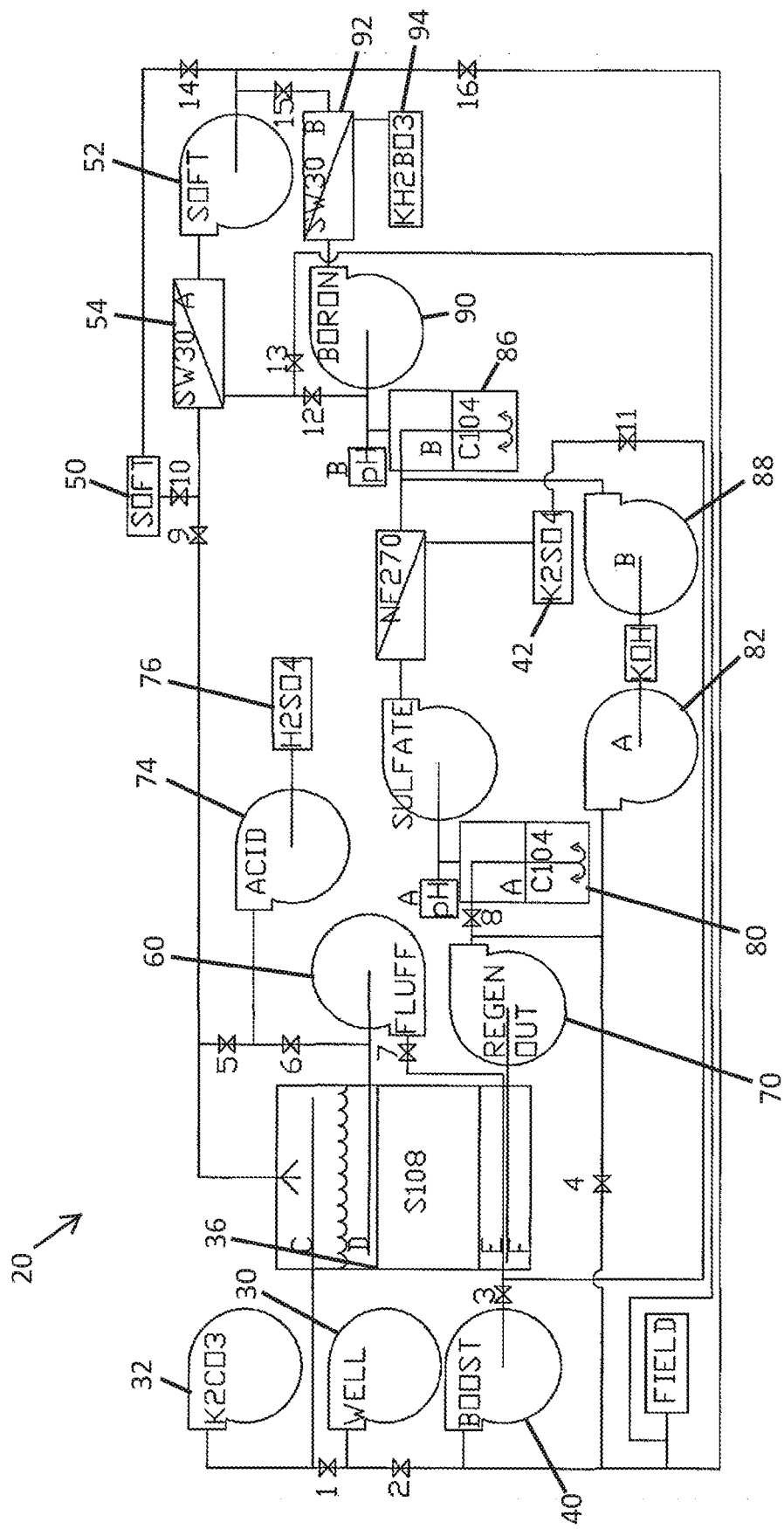
FIG. 1 illustrate a simplified schematic diagram of the process for boron removal from water showing the system constructed in accordance with the present invention.

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Through the current invention, it has been discovered that boron selective ion exchange resin modified to the sulfate form works better than ordinary known ion exchange resin. For example, Purolite® S108 is normally in ionic form as a free base. As will be described herein, in one non-limiting embodiment, Purolite® S018 is modified to a sulfate form.

For many well water sources, boron is already in the form of a sodium borate salt (borax) or a calcium borate salt and therefore no alkaline salt addition, such as sodium carbonate or potassium carbonate, is required to reduce boron leakage. Potassium carbonate is preferred since it is nontoxic to plants.

However, for other feed water sources, boron is present in the form of alkaline earth salts, such as calcium borate. In that case, the optional addition of an alkali salt such as potassium carbonate can be used to convert calcium borate into potassium borate and calcium carbonate. This greatly reduces any boron leakage from the resin bed.

The pH of the feed water stream will drop considerably as it passes through the boron-selective ion exchange resin bed modified with sulfate, due to the release of protons from the borate ion when it is absorbed by the boron-selective resin. In extreme cases, the pH can drop from approximately 11 to less than 7. This pH change is quite useful in monitoring bed exhaustion, thoroughness of regeneration, and resin capacity. In short, pH is an excellent proxy for measuring boron removal capacity.

Soft membrane reverse osmosis (RO) membranes filter irrigation feed water after passage through the resin bed to remove hardness and salts from the water while returning the reject water to an irrigation distribution line. This allows one to have modest permeate water yields to reduce membrane pressure and minimize possible fouling without the consequence of generating a waste stream since the reject water is consumed as irrigation water. This low total dissolved solids (TDS) water may be used to rinse off residual hardness ions, carbonates and salts from the exhausted boron resin bed. The clean resin bed reduces $CO_2$ gas generation and prevents hardness contamination, which could foul the membranes and pH resin beds during the regeneration process. One may store the low TDS water and use it to clean solar panels, make liquid fertilizer, or allow one to pass the water through the soft membrane a second time to produce even cleaner rinse water for the boron resin bed and produce faster rinse flow rates.

It takes approximately 0.5% to 2% sulfuric acid concentration to remove boron from the resin. The boron concentration in the regeneration affluent is about 0.1% to 0.4%. The majority of the salt generated is potassium sulfate. The regeneration affluent is a mixture of boric acid and sulfuric acid, which is difficult to handle and transport. It is desirable to return the sulfuric acid as potassium sulfate to crops, since it may be returned to crops via the irrigation. This adds valuable fertilizer to crops and eliminates the need to transport this material from the farm. This separation also allows one to purify and concentrate the potassium borate with a membrane.

Fortunately, one can selectively filter out potassium sulfate as neutral salt (approximately pH 2 to 8) through a brackish water membrane (such as, for example, Filmtec® NF270) while allowing the boric acid to freely pass. A pH close to neutral is preferred because it is less corrosive and only minimal amounts of boron is rejected. The low pH regeneration product water is passed through a weak acid resin bed (such as for example Purolite® C104) in an upward flow. Potassium hydroxide is injected before the resin bed and the pH is measured after the bed to maintain a pH of 6 to 8 by controlling the speed or time duty of the potassium hydroxide metering pump. The weak acid resin acts as a strong buffering agent to prevent wild swings in pH.

The permeate from the potassium sulfate membrane is adjusted to approximately pH 10 to 12 by passing the water through a weak acid resin bed (such as for example Purolite® C104) in an upward flow. Potassium hydroxide is injected before the resin bed and the pH is measured after the bed to maintain a pH of 10 to 12 by controlling the speed or time duty of the potassium hydroxide pump, which puts the boric acid in a fully ionized state. The resulting potassium borate salt is readily concentrated with an RO (seawater) membrane. The higher-pressure membrane (1,700 PSI) is preferred. The permeate is reacidified by adding acid and returned to the top of the resin bed to wash off additional boron. Optionally, the permeate from the boron membrane may be passed through a second RO seawater membrane (without acid addition) to remove additional boron and return the reject water to the boron membrane pump intake. This permeate is reacidified by adding acid and returned to the top of the resin bed to wash off additional boron. Since the only water loss is reject water from the NF270 membrane (potassium sulfate concentrate) and the reject from seawater membrane as potassium borate concentrate very little water is consumed during the rinse process. Over 80% of the water can be recycled as boron resin bed rinse water.

pH Control

With such high acid concentrations, 50% potassium hydroxide injections create wild swings in pH. Adjusting the pH before each stage of the membrane separation would normally require multiple potassium hydroxide pumps, bulky mixing tanks with stirrers, level control between mixing tanks and pH probes for each stage. A three-stage neutralization system for each pH adjustment is common. For this type of systems, a total of six mixing tanks, potassium hydroxide pumps, pH probes, level sensors, and transfer pumps would be required.

The use of pH resin control beds allows control of the pH of the potassium sulfate membrane pump feed and potassium borate pump feed with just one pH probe, a sampler pump, two potassium hydroxide pumps, and two weak acid resin beds. The potassium hydroxide dosing pumps may be fixed speed, however, variable speed pumps are preferred. The sampler pump switches between the outputs of the two beds to monitor the pH of each bed. The buffering capacity of the pH resin beds is so large that only occasional monitoring of each pH point is required.

Referring to the drawings in detail, FIG. 1 illustrates a schematic diagram of the invention. Four different modes are provided and will be described - boron removal service mode, bypass mode, soft water tank fill mode, and regeneration mode.

Boron Removal Mode

Initially, well water from a well is brought up to the invention 20 via a pump 30. The feed stream of water is directed to an unpressurized, ambient temperature open boron resin tank.

Optionally, a potassium carbonate ($K_2CO_3$) pump 32 adds alkalinity to the feed water stream to ensure that boron is in alkaline borax salt form, such as potassium borate or sodium borate.

The well pump 30 speed is controlled to maintain proper liquid level in an open boron resin tank or vessel 36. A valve 1 is opened to direct flow of the feed water to the boron resin tank 36. The feed water stream flow is introduced through a well screen diffuser C having slots or openings to minimize resin mixing. The well screen diffuser C promotes uniform flow across the resin bed (to be described). The water passes through resin and gravel (or plastic beads) to minimize pressure drop. The vessel 36 may include a layer of gravel 24 at the base of the vessel with a layer of sand thereon and is sucked through a well screen collector E and manifold D and an open valve 3. The speed of a booster pump 40 is used to control and maintain irrigation line pressure. Stored potassium sulfate solution ($K_2SO_4$) in a potassium sulfate tank 42 is drawn or sucked through an open valve 11 until the resin tank is empty.

Bypass Mode

It is possible to bypass the tank or vessel 36 when it is desirable to isolate the resin bed during regeneration or when the resin bed is exhausted. In this case, the well pump 30 speed is controlled by the irrigation line pressure and the bypass valve 2 is opened. Valve 1 and 3 are closed.

Soft Tank Fill

A soft water tank 50 may be filled with soft low salt water, using the pressurized irrigation water and opening valve 16 and turning on a soft pump 52. A soft membrane separator 54 (SW30 A) reject water is returned to the irrigation line by opening valve 13. The permeate water is directed to the soft tank 50 by opening a valve 10.

Regeneration

Periodically, the system 20 is switched from a service mode to a regeneration mode so that the boron-selective resin in the bed of the ion exchange vessel 36 is periodically regenerated.

Drain Step

The boron resin bed is drained through collector E to the level shown in FIG. 1 by opening the valve 3 and then closing the valve when the proper level is achieved (just above the manifold collector D).

Backwash Step

The resin bed is fluidized with a backwash pump 60 (fluff) on and a valve 7 is open that collects fluid above the resin bed through a well screen collector D. The pump fluid discharges into a lower well screen collector E at the bottom of the resin bed, which is immersed in coarse plastic or gravel beads.

In one example, the flow is about 1 GPM per square to fluidize the resin bed. The resin bed in completely fluidized in about 7 minutes. Sometimes a two-minute pause facilitates the breaking up of clumps.

Rinse Step

The soft pump 52 acquires water from the soft tank 50 by opening a valve 14 or, alternately, field water by opening a valve 16, and pumps through the seawater membrane. The membrane reject water goes to the field by a valve 13, while the permeate passes to a spray bar by a valve 9. A regen out pump 70 sucks from a collector F, which discharges through an open valve 4 to the field to drain the resin bed to maintain a constant liquid level in the resin bed. The rinse continues until 1 to 3 bed volumes of soft water passes through the resin bed.

Neutralization

The fluff pump 60 is turned on with valve 7 open. Once flow is proven, an acid pump 74 in communication with tank 76 ($H_2SO_4$) is turned on and valve 6 opened. The 93% concentrated sulfuric acid is preferred to minimize regeneration volume. The acid pump 74 is on until the resin bed is neutralized and a .5% to 2% acid solution is created (2 to 4 hours). Then the acid pump 74 is turned off. The fluff pump 60 continues to run for 0.5 to 2 hours.

Boron Harvest

The regen out pump 70 is turned on sucking from collector F and discharged through a valve 8 opened which passes water through a pH resin bed 80 (A C104). KOH pump A is turned on if pH A is less than 6 and off if greater than 8. The ideal pH is about 7. The effluent from resin bed 80 (A C104) feeds a sulfate pump 82 which leads to a sulfate (NF270) membrane 84. The reject flows to fill $K_2SO_4$ tank 42. The permeate passes through pH resin bed 86 (B C104). KOH pump B 88 is turned on if the pH is less than 10 and off if the pH is greater than 12. The ideal pH is about 11.

The effluent from the resin bed 86 (B C104) feed boron pump 90 to boron membrane 92 (SW30B). The reject water fills ($KH_2BO_3$) tank 94. The permeate is directed to soft pump 52 through valve 15. The soft membrane 92 (SW 30 B) reject water is returned to the boron pump 90 feed by valve 12. The permeate water is directed to the spray bar by valve 9. Acid may be added to this water with acid pump 74 ($H_2SO_4$) to adjust the pH to an acidic pH. The boron harvest may continue until the liquid level is just above the boron (S108) resin bed in the tank 36.

The regenerated boron resin bed is then returned to service so that the process operates in closed loop fashion.

Whereas, the invention has been described in relation to the drawings attached hereto, it should be understood that other and further modifications, apart from those shown or suggested herein, may be made within the scope of this invention.

What is claimed is:

1. A process for boron removal from feed water, which process comprises:
    introducing a stream of feed water containing boron therein to an ion exchange vessel containing boron-selective resin in sulfate or chloride form and containing methylglucamine;
    permitting said feed water to react with said boron-selective resin in sulfate or chloride form;
    withdrawing effluent from said ion exchange vessel;
    adjusting the effluent from said ion exchange vessel with potassium hydroxide and a pH control resin to a neutral pH to produce potassium sulfate and boric acid; and
    periodically regenerating said boron-selective resin in said ion exchange vessel.

2. The process as set forth in claim 1 including the preliminary step of adding an alkaline sodium salt or an alkaline potassium salt to said stream of feed water.

3. The process as set forth in claim 2 wherein said alkaline potassium salt is chosen from the group consisting of potassium hydroxide, potassium bicarbonate, and potassium carbonate.

4. The process as set forth in claim 1 wherein in the introducing step and permitting step said boron-selective resin is in sulfate form.

5. The process as set forth in claim 1 wherein said stream of feed water is introduced to said ion exchange vessel containing boron-selective resin through a diffuser screen.

6. The process as set forth in claim 1 wherein said boron-selective resin is macroporous polystyrene resin.

7. The process as set forth in claim 1 wherein said stream of feed water is obtained from a subterranean well.

8. The process as set forth in claim 1 wherein said ion exchange vessel is an open vessel at ambient pressure and ambient temperature.

9. The process as set forth in claim 1 wherein said step of regenerating said boron-selective resin comprises:
    draining the ion exchange vessel through a collector; and
    fluidizing a resin bed with fluid from a reverse osmosis membrane by a backwash pump.

10. The process as set forth in claim 1 including an additional step before said regenerating of rinsing said resin with an acid wherein the feed water is permeate from a reverse osmosis membrane from which rejection water is used to irrigate crops.

11. The process as set forth in claim 1 including an additional step of monitoring pH of effluent from said ion exchange vessel after reacting to determine capacity of said resin for boron-containing ions.

12. The process as set forth in claim 1 including the additional step of filtering out potassium borate salt with a single or two stage reverse osmosis membrane.

13. The process as set forth in claim 12 including adjusting the permeate to a neutral or acidic pH with acid and using the effluent for regeneration rinse water.

* * * * *